(12) United States Patent
Thelen et al.

(10) Patent No.: US 6,629,072 B1
(45) Date of Patent: Sep. 30, 2003

(54) METHOD OF AN ARRANGEMENT FOR SPEECH RECOGNITION WITH SPEECH VELOCITY ADAPTATION

(75) Inventors: Eric Thelen, Sunnyvale, CA (US); Heribert Wutte, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 450 days.

(21) Appl. No.: 09/649,675

(22) Filed: Aug. 28, 2000

(30) Foreign Application Priority Data

Aug. 30, 1999 (DE) .......................................... 199 41 227

(51) Int. Cl.[7] .............................................. G01L 15/00
(52) U.S. Cl. ....................................................... 704/251
(58) Field of Search .................................. 704/251, 275

(56) References Cited

U.S. PATENT DOCUMENTS

| | | | |
|---|---|---|---|
| 5,687,288 A | 11/1997 | Dobler et al. ................ | 395/264 |
| 5,870,709 A | * 2/1999 | Bernstein ..................... | 704/275 |
| 6,006,175 A | * 12/1999 | Holzrichter .................. | 704/208 |
| 6,226,615 B1 | * 5/2001 | Kirby et al. .................. | 704/272 |

FOREIGN PATENT DOCUMENTS

| | | | | |
|---|---|---|---|---|
| GB | 2102171 A | 1/1983 | ............. | A61F/5/58 |
| JP | 59216242 | 12/1984 | ............. | G06F/3/16 |
| WO | 8707460 A1 | 12/1987 | ............. | H04M/1/26 |

* cited by examiner

*Primary Examiner*—Talivaldis Ivars Smits
(74) *Attorney, Agent, or Firm*—Daniel J. Piotrowski

(57) ABSTRACT

With a method of and an arrangement for speech recognition a measurement of the speech velocity rate is carried out in a measuring unit (2) so as to reduce the error rate of the recognition result, which speech velocity is announced to the speaker via an output unit (3) and warning is given if the velocity is out of speech recognition adaptation range.

11 Claims, 1 Drawing Sheet

METHOD OF AN ARRANGEMENT FOR SPEECH RECOGNITION WITH SPEECH VELOCITY ADAPTATION

BACKGROUND OF THE INVENTION

The invention relates to a method of and an arrangement for speech recognition.

For the execution of speech recognition it is necessary for a user to supply respective speech utterances to a speech recognizer. There is a plurality of criteria for this, which influence the quality of the recognition result produced from the speech utterance. A user is often not aware of the criterions of such a speech recognition device. Only the experienced user of a speech recognition device is successful in keeping the error rate in the recognition process so low that an acceptable result is achieved. Speech recognition devices have been developed such that also different speakers can produce speech utterances, which are then recognized by the speech recognition system. Such speech recognizers are denoted as speaker-independent speech recognition systems.

WO 87/07460 describes a telephone-based speech recognition system, in which the speech recognizer informs a user that no appropriate word was found in the vocabulary. The user is requested to repeat the speech utterance. When the speech recognition system is supplied with a too low-voiced or disturbed speech utterance, the user of the speech recognition system is requested to speak into the microphone at a higher voice.

However, the fact that each speech recognizer is based on an acoustic model, which in turn is based on an average speech velocity, is not taken into account. A deviation of the user's speech velocity from the average speech velocity of the acoustic model considerably increases the error rate during the recognition process.

SUMMARY OF THE INVENTION

It is an object of the invention to provide a method and a device in which the error rate during the recognition process is reduced.

The object is achieved in that the speech velocity is measured, which the user is informed of.

For executing speech recognition, a user produces a speech utterance with an appropriate velocity. Acoustic speech models, which are based on an average velocity, are used for the recognition process. It is necessary to make an adaptation for a deviating speech velocity. With smaller deviations of the speech velocity from the average speech velocity of the acoustic model, an adaptation is possible, but leads to a degraded evaluation of hypotheses in the recognition process as a result of the time distortion resulting from the adaptation. With larger deviations from the average speech velocity, an adaptation is no longer possible, because the models cannot be run through with optionally high velocity. Furthermore, when most users speak fast, they often tend to swallow short words or word endings. Such errors cannot be reliably recognized by the speech recognition system. Whereas an adaptation is possible to a certain extent, an avoidance of pronunciation inadequacies with many possible users is only possible in the form of a reduction of the pronounciation inadequacies. The lacking words or words not fully pronounced can in all cases be inferred from the context.

Therefore, the user's speech velocity is measured and the user is informed thereof via an output means. The user is then persuaded to stick to an optimized speech velocity, which is oriented to the average speech velocity of the speech model. Output means are, for example, LEDs for which a respective color (green) shows an acceptable speech velocity and another color (red) shows an unacceptable deviation. Another possibility is the display of a number value by which the user is informed of the range in which this number value is to lie. With an exclusively audio-based communication, the user is informed by means of a warning signal that the speech velocity lies outside an acceptable range.

As a result, a lower error rate is advantageously achieved during the recognition process.

The measured speech velocity can advantageously also be applied to the speech recognizer as a confidence measure or for controlling the search process. The speech recognizer is then informed of a measure according to which the speech recognizer can decide whether the speech velocity lies within respective limits, or whether a too high speech velocity is to be taken into account during the recognition process. The same holds for a too low speech velocity.

During the recognition the speech velocity is determined by means of a suitable measure. A speech recognition system is to be trained before it can perform a recognition. Therefore, it is important to take the speech velocity into account and announce this to the user already during the training.

A measure for the speech velocity is, for example, the number of spoken and also recognized words per time unit. However, more accurate is the measurement of the recognized phonemes per frame where the frame is considered to be a predefined time interval.

The announcement whether the speech velocity lies in the acceptable range may be linked with a transgression of an experimentally determined threshold value. Consequently, the user is then only informed when the speech velocity is too high, so that he is not distracted by the information— speech velocity lies in the acceptable range.

The threshold value may also be determined during the recognition process in that respective measures are transgressed or fallen short of during the recognition process.

A particular advantage of this invention is obtained from the learning process, which a user is to undergo. The user makes a great effort to attain a high efficiency when using a speech recognition system. Since his speech velocity is displayed relative to the average speech velocity of the acoustic model, he consequently learns to adapt his speech velocity and thereby achieves a low error rate.

The object of the invention is achieved by a speech recognition device in which a measuring unit determines a speech velocity and informs the user thereof by means of an output unit.

BRIEF DESCRIPTION OF THE DRAWINGS

An example of embodiment of the invention will be further explained in the following with reference to the drawing.

DETAILED DESCRIPTION OF THE INVENTION

Figure 1:
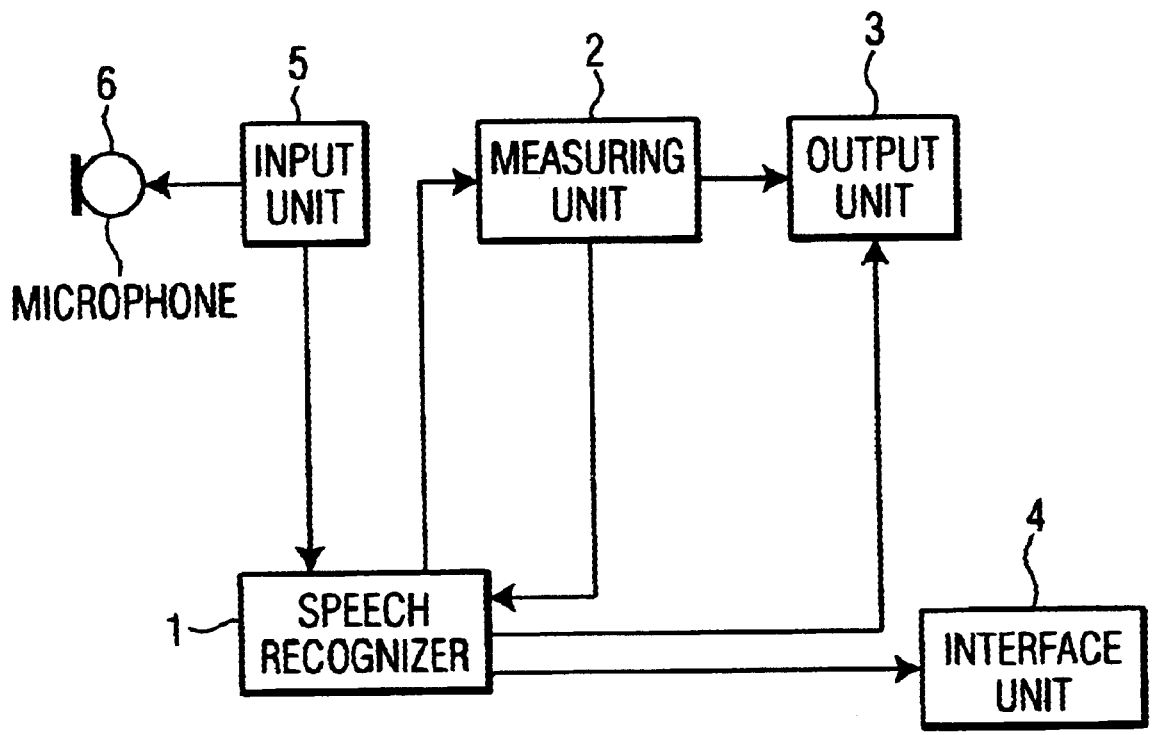

FIG. 1 shows a speech recognition device. The speech utterances are produced by a user or speaker and fed to a microphone 6. These analog speech data are applied to an input unit 5, which performs a digitization of the speech data. These digital speech data are then applied to the speech recognizer 1. There the speech recognition process is carried out. To determine the speech velocity, the measuring unit 2 is supplied with the recognized phonemes and/or words. By means of the recognized phonemes and/or words, the speech velocity is determined in the measuring unit 2. The measuring unit 2 is connected to the output unit 3 and the speech recognizer 1. The measured speech velocity is applied to the output unit 3 and to the speech recognizer 1 as the case may be. The speech recognizer 1 applies the recognition result, for example, to an interface unit 4 for a text-processing program, which shows the recognized words on a monitor.

An acoustic model is available to the speech recognizer 1 for the recognition result to be generated. This acoustic model is based on an average speech velocity. This average speech velocity is compared with the measured speech velocity either in the speech recognizer 1, or directly applied by the speech recognizer 1 to the output unit 3 for a direct comparison with the measured speech velocity in the output unit 3.

For the measurement of the speech velocity, a respective time unit is used as a base in the measuring unit. When phonemes are measured per time unit, phonemes are counted per frame and with words are counted per second. The type of measurement used for measuring the speech velocity depends on the application.

What is claimed is:

1. A method of speech recognition characterized in that a speech velocity is measured which is announced to the speaker.

2. A method as claimed in claim 1, characterized in that the measured speech velocity is fed to the speech recognizer (1).

3. A method as claimed in claim 1, characterized in that the speech velocity is determined by means of a measuring unit (2) during the recognition and/or training.

4. A method as claimed in claim 1, characterized in that recognized phonemes and/or words are measured per predefinable time interval.

5. A method as claimed in claim 1, characterized in that the speech velocity is shown as a function of a threshold value.

6. A method as claimed in claim 5, characterized in that the threshold value is determined as a function of the error rate.

7. A method as claimed in claim 1, characterized in that the speech velocity is continuously shown to the user.

8. The method as claimed in claim 1, wherein the providing step includes informing the speaker of the speech velocity.

9. A speech recognition device, characterized in that a measuring unit (2) determines a speech velocity, determines whether, based on the measured speech velocity, speech recognition adaptation can be made, and informs the speaker thereof by means of an output unit (3).

10. A device as claimed in claim 9, characterized in that the output unit (3) shows a range of the speech velocity by means of colors.

11. A device as claimed in claim 9, characterized in that a transgression of the speech velocity is indicated by means of an audio output.

\* \* \* \* \*